June 8, 1954
M. P. SCHIRA, JR
2,680,477
PUMP CAP FOR FUEL TANKS
Filed Dec. 7, 1951
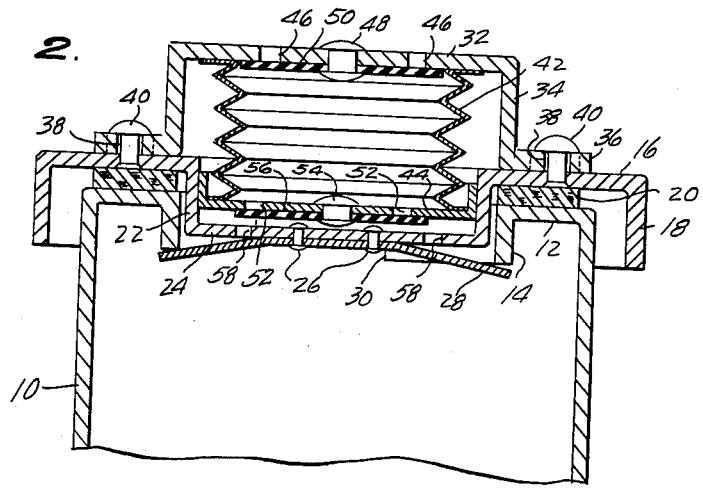
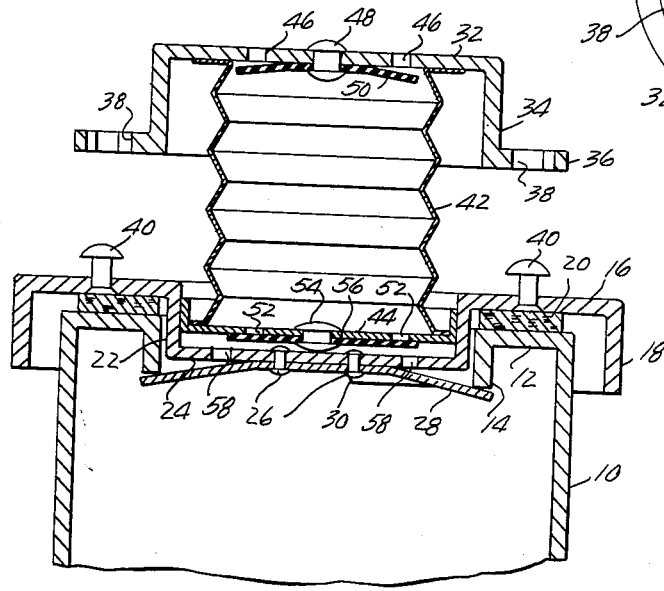
INVENTOR
MARTIN P. SCHIRA, JR.
BY
ATTORNEYS Patented June 8, 1954

2,680,477

UNITED STATES PATENT OFFICE 2,680,477

PUMP CAP FOR FUEL TANKS

Martin P. Schira, Jr., Spring Lake Heights, N. J.

Application December 7, 1951, Serial No. 260,367

2 Claims. (Cl. 158—50.1)

This invention relates to a cap for fuel tanks, such as the gasoline tank of an automotive vehicle. More particularly, the invention has reference to a cap which normally serves as a closure for the fuel tank, but which is novelly adapted for use as a manually operable pump in cases of emergency.

It is a fairly common occurrence for the fuel pump of an internal combustion engine to fail, and when the automotive vehicle on which the pump is mounted is in a relatively unpopulated area at the time, the stranded motorist finds it difficult to obtain assistance.

It is, accordingly, the main object of the present invention to provide a fuel tank cap for automotive vehicles which normally acts as a conventional tank closure, but which is formed as a manually operable pump which can be used to build up pressure upon the surface of the fuel within the tank effective to force the fuel to the vehicle engine, thus to permit operation of the vehicle despite the fact that the regular pump provided therein has broken down.

Another important object is to provide a cap of the character stated which can be substituted for the conventional fuel tank cap simply by removing the conventional cap and replacing it with the cap constituting the present invention, the cap which I have conceived being so designed as to require no modification or redesigning of the filler neck of the fuel tank.

Yet another object of the invention is to provide a pump cap as stated which will be compact, relatively inexpensive, and highly durable.

Other objects will appear from the following description, the claims appended thereto, and from the annexed drawing, in which like reference characters designate like parts throughout the several views, and wherein:

Figure 1 is a top plan view of a cap formed in accordance with the present invention;

Figure 2 is a sectional view, on an enlarged scale, taken substantially on line 2—2 of Figure 1, the filler neck of a fuel tank being illustrated fragmentarily; and Figure 3 is a view similar to Figure 2 in which the cap has been adjusted to fuel-pumping position.

At 10 I have illustrated a filler neck such as is conventionally provided upon fuel tanks of automotive vehicles. The filler neck 10 is formed at its inlet end with an inturned flange 12 integral with an annular, depending lip 14.

In accordance with the present invention, I provide a cap for the filler neck 10 that includes a base 16 which may be stamped or otherwise formed from a single piece of flat metal material. The base 16 is formed to a circular shape, and is arranged concentrically to and overlies the filler neck.

Formed upon the outer periphery of the base 16 is a depending marginal flange member 18, which performs the function of reinforcing the marginal area of the base so as to prevent accidental deformation of the base.

For the purpose of providing a sealed connection between the cap and filler neck, an annular gasket 20 of cork or its equivalent is positioned upon the under side of the base 16, and may be permanently secured thereto in any suitable manner, if desired. The annular gasket 20 is interposed between the cap and the filler neck, and thus it is seen that when the cap is applied to the filler neck, leakage from the fuel tank will be effectively prevented.

The base 16 is provided with a central depression, defining a recess formed with a side wall 22 that extends downwardly into the filler neck inlet opening, said recess being provided with a plane bottom wall 24 integral with said side wall. Rivets 26, or equivalent fastening elements, are carried by the bottom wall 24 and secure fixedly to said bottom wall a spring latch 28, which may be formed from a length of relatively narrow spring metal material disposed diametrically of the circular bottom wall 24 of the recess, and underlying the base 16.

The spring latch 28 is so proportioned as to length as to project beyond the edge of the inlet opening of the filler neck 10, so as to engage under the depending lip 14 of the filler neck when the cap is rotated to one position relative to said filler neck. In this connection, the lip 14 is provided with diametrically opposite cam notches 30 that are adapted to receive the opposite ends of the spring latch, after which the cap is rotated to engage the ends of the latch under the lip 14, thereby to securely attach the cap to the inlet end of the neck, while at the same time compressing the gasket 20 to prevent accidental leakage from the filler tank.

The cap formed according to the present invention includes a cup-like top portion 32 formed integrally with a side wall 34 that extends toward the base 16, the side wall 34 being provided with an outwardly extended flange 36 having diametrically opposite keyhole slots 38. The base 16 is provided with diametrically opposite, headed pins 40 extending upwardly through the keyhole slots, so as to normally engage the top portion 32 and retain it in the position illustrated in Figure 2.

Interposed between the top portion 32 and the base 16 is a bellows 42, the upper end of which is secured fixedly in any suitable manner to the upwardly offset, central portion of the cup-like member 32.

At its lower end the bellows 42 is fixedly attached to a support plate 44 that is fixedly attached to the base 16 within the depressed central portion thereof, the plate 44 being elevated slightly above the bottom wall 24 of said central portion.

Formed in the top portion 32 of the cap are spaced inlet ports 46, and a rivet 48 is secured to said top portion between the inlet ports for the purpose of attaching to the under side of the top portion a check valve 50. The check valve 50 in the present instance comprises a flexible piece of rubber or the like that normally overlies the respective inlet ports 46, in the manner illustrated in Figure 2. The check valve 50, as will be understood, is so arranged relative to said inlet ports as to permit air to enter the bellows 42 through the ports 46, while preventing movement of air out of said ports.

In the plate 44 are formed spaced outlet ports 52, communicating with the interior of the bellows 42. A rivet 54 secured centrally to the plate 44 is adapted to attach a valve 56 to the under side of the plate 44 between said plate and the bottom wall 24 of the base 16. The check valve 56 is formed similarly to the check valve 50 comprising a soft rubber disc arranged to permit air to move out of the bellows 42 through the outlet ports 52, while preventing air from moving into the bellows through said outlet ports.

In the bottom wall 24 are formed spaced apertures 58 that are continuously in communication between the interior of the filler neck 10 and the space between the plate 44 and the bottom wall 24.

In use, the cap appears normally in the position illustrated in Figure 2. In this position of the parts, the cap is adapted to serve as a conventional fuel tank closure. At any time that the fuel tank is to be filled, it is merely necessary to rotate the cap base 16 bodily, so as to disengage the spring latch 28 from the lip 14 of the filler neck. This partial rotation of the base 16 in one direction permits the entire cap to be removed from the filler neck 10, so that fuel may be deposited within the fuel tank. After the fuel has been placed within the fuel tank, the base 16 is applied once again to the filler neck and rotated in an opposite direction.

During normal operation of the vehicle, the fuel tank will be vented by reason of the construction which I have devised, so as to permit normal operation of the engine supplied by said fuel. In other words, as the level of the fuel drops within the fuel tank, a partial vacuum would normally tend to form within said fuel tank. However, as soon as said partial vacuum tends to form, air will move through the inlet ports 46, through the bellows 42, through the outlet ports 52, and then through the apertures 58 into the fuel tank. The check valves, in this connection, are highly flexible, so as to be readily moved away from their associated ports by the air passing into the fuel tank during normal operation of the vehicle.

Assuming, however, that the fuel pump of the vehicle has broken down, the difficulty being one that will still permit fuel to be forced through the fuel pump, it is merely necessary for the user to adjust the top portion 32 to the position illustrated in Figure 3. This is done while the base 16 is still left in a position in which it is attached sealably to the upper end of the filler neck 10. The top portion 32 is adjusted to the position illustrated in Figure 3 by partially rotating said top portion in one direction, so as to move the heads of the pins 40 to the large ends of the keyhole slots 38.

With the top portion 32 in the position illustrated in Figure 3, the user forces said top portion downwardly toward the base 16. As a result, air within the bellows 42 will be forced through the outlet ports 52 into the fuel tank. The top portion 32 is then pulled upwardly, and air will rush in through the inlet ports 46, into the bellows. The top portion 32 is then forced once again toward the base 16, so as to again force air into the fuel tank. The operation is repeated until the fuel within the fuel tank is under considerable pressure, and this will cause the fuel to be forced through the fuel supply line to the engine, thereby to permit the vehicle to operate until its destination has been reached, or until a repair shop can be located.

The pump cap illustrated and described, as will be apparent, can be formed at relatively low cost, considering the benefits to be obtained thereby, and normally provides a compact cap assembly usable as a conventional fuel tank closure, without modification or redesign of the filler neck of the fuel tank. The cap, in this connection, can be substituted for a conventional closure cap merely by removal of the conventional closure cap, and replacement of said cap by a cap formed in accordance with the present invention.

It is believed that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A combined closure cap and air pump for a fuel tank having a filler neck comprising: a base proportioned as a cap member for the neck; means releasably and sealably engaging the base with the neck; a bellows anchored at one end to the base and having its other end adapted for manual actuation toward and away from the base, thus to expand and contract the bellows in the neck-capping position of the base, the bellows having check-valved inlet and outlet ports respectively communicating with atmosphere and with the interior of the tank, thus to compress air within the tank responsive to expansion and contraction of the bellows and thereby force fuel from the tank; a top portion secured to said other end of the bellows and cooperating with the base to provide a housing for the bellows in its contracted position; and means separably connecting the base and top portion in said contracted position of the bellows for normally enclosing the bellows in an inoperative, contracted position thereof.

2. A combined closure cap and air pump for a fuel tank having a filler neck comprising: a base adapted to be releasably attached to the neck to serve normally as a closure therefor, the base having a central depressed portion formed with a bottom wall disposed within the neck;

a plate mounted in the depressed portion above the bottom wall to define an open space between the plate and the bottom wall, the base having an aperture providing continuous communication between the space and the interior of the neck; a bellows anchored at one end to the plate and having its other end adapted to be manually actuated toward and away from the plate, thus to expand and contract the bellows, the plate having a port communicating between the interior of the bellows and said space; a check valve on the plate arranged to permit air flow through said port only from the bellows into said space; a top portion of inverted cup shape attached to said other end of the bellows and having a port communicating between the bellows interior and atmosphere; a check valve carried by the top portion and arranged to permit air flow through the second-named port only from atmosphere to the bellows interior; and means for separably connecting said top portion directly to the base, whereby to form a housing between the cup-shaped portion and the depressed portion of the base in which the bellows may be normally housed protectively in an inoperative, contracted position.

References Cited in the file of this patent

UNITED STATES PATENTS

| Number | Name | Date |
|---|---|---|
| 45,086 | Sexton | Nov. 15, 1864 |
| 496,843 | Arnott | May 9, 1893 |